(12) United States Patent
Ohta et al.

(10) Patent No.: US 7,662,245 B2
(45) Date of Patent: Feb. 16, 2010

(54) STEERING RACK COMPRISING STEEL BAR WITH RACK TEETH

(75) Inventors: Atsuhiko Ohta, Osaka (JP); Makoto Kamei, Osaka (JP); Kazuhiro Watanabe, Osaka (JP); Yukinori Kanaike, Osaka (JP); Osamu Tsukamoto, Osaka (JP); Masakazu Ikeda, Kobe (JP); Gorou Anan, Kobe (JP); Hiroshi Itoziri, Kobe (JP)

(73) Assignee: Koyo Seiko Co., Ltd., Osaka (JP)

( * ) Notice: Subject to any disclaimer, the term of this patent is extended or adjusted under 35 U.S.C. 154(b) by 445 days.

(21) Appl. No.: 10/558,359

(22) PCT Filed: May 27, 2004

(86) PCT No.: PCT/JP2004/007678

§ 371 (c)(1),
(2), (4) Date: Nov. 22, 2006

(87) PCT Pub. No.: WO2004/106574

PCT Pub. Date: Dec. 9, 2004

(65) Prior Publication Data

US 2007/0113698 A1 May 24, 2007

(30) Foreign Application Priority Data

May 27, 2003 (JP) .............................. 2003-148906
Jun. 2, 2003 (JP) .............................. 2003-157029

(51) Int. Cl.
*C22C 38/14* (2006.01)
*C22C 38/04* (2006.01)
*C22C 38/02* (2006.01)
*C22C 38/06* (2006.01)

(52) U.S. Cl. ...................... 148/330; 148/320

(58) Field of Classification Search ................. 148/657, 148/663, 572–575, 320, 330, 333; 420/128, 420/126
See application file for complete search history.

(56) References Cited

U.S. PATENT DOCUMENTS 4,765,849 A * 8/1988 Roberts ....................... 148/335

(Continued)

FOREIGN PATENT DOCUMENTS

EP 1069201 1/2001

(Continued)

*Primary Examiner*—Deborah Yee
(74) *Attorney, Agent, or Firm*—Rabin and Berdo, P.C.

(57) ABSTRACT

A steel bar for a steering rack that contains 0.50 to 0.60% by mass of C, 0.05 to 0.5% by mass of Si, 0.2 to 1.5% by mass of Mn, 0.0005 to 0.003% by mass of B, 0.005 to 0.05% by mass of Ti, 0.0005 to 0.1% by mass of Al, and 0.002 to 0.02% by mass of N is provided. Given D as a diameter of the steel bar, then the steel bar is adjusted in such a manner that quenched and tempered structures in a portion of the steel bar at a depth of D/4 from a surface satisfy conditions I), II), and III) as follows: I) a sum of a tempered bainitic structure and a tempered martensitic structure accounts for 30 to 100% in area percentage; II) a regenerated perlite structure accounts for 0 to 50% in area percentage; and III) a sum of the tempered bainitic structure, the tempered martensitic structure, and the regenerated perlite structure accounts for 50 to 100% in area percentage.

4 Claims, 8 Drawing Sheets

U.S. PATENT DOCUMENTS

| | | | | |
|---|---|---|---|---|
| 5,454,883 A | * | 10/1995 | Yoshie et al. | 148/320 |
| 5,473,960 A | | 12/1995 | Sakamoto et al. | |

FOREIGN PATENT DOCUMENTS

| | | |
|---|---|---|
| GB | 2345116 | 6/2000 |
| JP | 62-178472 | 8/1987 |
| JP | 62-180018 | 8/1987 |
| JP | 63-065020 | 3/1988 |
| JP | 4-254547 | 9/1992 |
| JP | 05-222450 * | 8/1993 |
| JP | 07090484 | 4/1995 |
| JP | 9-25541 | 1/1997 |
| JP | 09287054 | 11/1997 |
| JP | 10-008136 | 1/1998 |
| JP | 10-8189 | 1/1998 |
| JP | 10195589 | 7/1998 |
| JP | 2000-153336 | 6/2000 |
| JP | 2001-79639 | 3/2001 |
| JP | 2003-166036 | 6/2003 |

* cited by examiner

STEERING RACK COMPRISING STEEL BAR WITH RACK TEETH

TECHNICAL FIELD

The present invention relates to a steel bar for a steering rack for use in a steering gear of a vehicle, a manufacturing method of the same, and a steering rack using the same.

BACKGROUND ART

Steering of a vehicle includes a type with a hydraulic power assist (hydraulic power steering) and a type with an electric power assist (electric power steering).

The hydraulic power steering is the mainstream in the related art, and it is to assist a steering force with pressure oil ejected from an oil pump that operates using an engine output. The hydraulic power steering, however, has a problem that the vehicle has lower fuel economy, because part of an engine output is used as its power source.

On the contrary, the electric power steering is to assist a steering force with an electric motor that operates using electric energy from the battery. Because the electric power steering system is able to enhance fuel economy of a vehicle in comparison with the hydraulic power steering, the use of the electric power steering has been spreading in recent years.

For the steering rack of a vehicle that extends in the crosswise direction, the following are required:

(1) excellent impact resistant to the extent that no breaking occurs upon application of an impact when the vehicle runs upon the curbstone or the like;

(2) a property (breaking resistance) of not causing a breaking when bending stress is applied; and (3) abrasion resistance of rack teeth.

For such a steering rack, S45C steel (see, for example, Japanese Unexamined Patent Publication (KOKAI) Nos. 62-178472 and 62-180018), and medium carbon steel (see, for example, Japanese Unexamined Patent Publication (KOKAI) Nos. 2000-153336 and 2001-79639) have been used in the related art. In addition, not only the abrasion resistance, but also the strength against bending stress (breaking resistance) is increased by forming a surface hardening layer through induction quenching.

For example, even when bending strength of the steering rack is increased through induction quenching, once cracking occurs in an induction quenched layer upon application of an excessively large load, the cracking develops to an inner portion and may possibly give rise to a breaking.

Further, the electronic power steering, the use of which has been spreading in recent years, tends to increase a contact surface pressure between the steering rack and the pinion gear in comparison with the hydraulic power steering, and abrasion resistance becomes insufficient when S45C steel is used. When medium carbon steel is used, the impact resistance is deteriorated even when abrasion resistance is increased by using a generous amount of C.

For example, Japanese Unexamined Patent Publication (KOKAI) No. 10-8189 discloses that in a case where induction quenching is performed with the addition of B, the resultant steel for a steering rack undergoes bending deformation without causing brittle fracture even when an excessively large load is applied. This steel for a steering rack is steel obtained by omitting quenching and tempering, and is substantially ferrite-perlite in terms of structure.

An object of the invention is to provide a steel bar for a steering rack that has excellent impact resistance while abrasion resistance is improved and is capable of preventing development of cracking, a manufacturing method of the same, and a steering rack using the same.

DISCLOSURE OF THE INVENTION

The inventors of the present invention completed the invention when they discovered that it is possible to prevent deterioration of the impact resistance by doping B even when an amount of C is increased, and further that by controlling a tempered bainitic structure, a tempered martensitic structure, and a regenerated perlite structure to fall within a specific range, the bending deformability can be enhanced to the extent that development and penetration of cracking can be prevented even if cracking occur.

To be more specific, the invention provides a steel bar for a steering rack that contains 0.50 to 0.60% by mass of C, 0.05 to 0.5% by mass of Si, 0.2 to 1.5% by mass of Mn, 0.0005 to 0.003% by mass of B, 0.005 to 0.05% by mass of Ti, 0.0005 to 0.1% by mass of Al, and 0.002 to 0.02% by mass of N. Herein, given D as a diameter of the steel bar for a steering rack, then the steel bar is adjusted in such a manner that quenched and tempered structures in a portion of the steel bar at a depth of D/4 from a surface satisfy conditions I), II), and III) as follows:

I) a sum of a tempered bainitic structure and a tempered martensitic structure accounts for 30 to 100% in area percentage;

II) a regenerated perlite structure accounts for 0 to 50% in area percentage; and III) a sum of the tempered bainitic structure, the tempered martensitic structure, and the regenerated perlite structure accounts for 50 to 100% in area percentage.

The steel bar for a steering rack may further contain Cr. Also, the steel bar may contain free-cutting elements (S, Pb, Bi, Te, Mg, Ca, rare-earth elements, Zr, etc.).

The steel bar for a steering rack of the present invention can be manufactured by quenching a steel bar obtained by rolling a steel piece at a temperature of 780° C. or higher, so that a sum of the bainitic structure and the martensitic structure in a portion at the depth of D/4 accounts for 30 to 100% (area percentage), and by tempering the steel bar for a time as short as or shorter than 20 min in an oven heated at ambient temperature of 660 to 720° C. followed by cooling to room temperature.

BEST MODE FOR CARRYING OUT THE INVENTION

Figure 1:
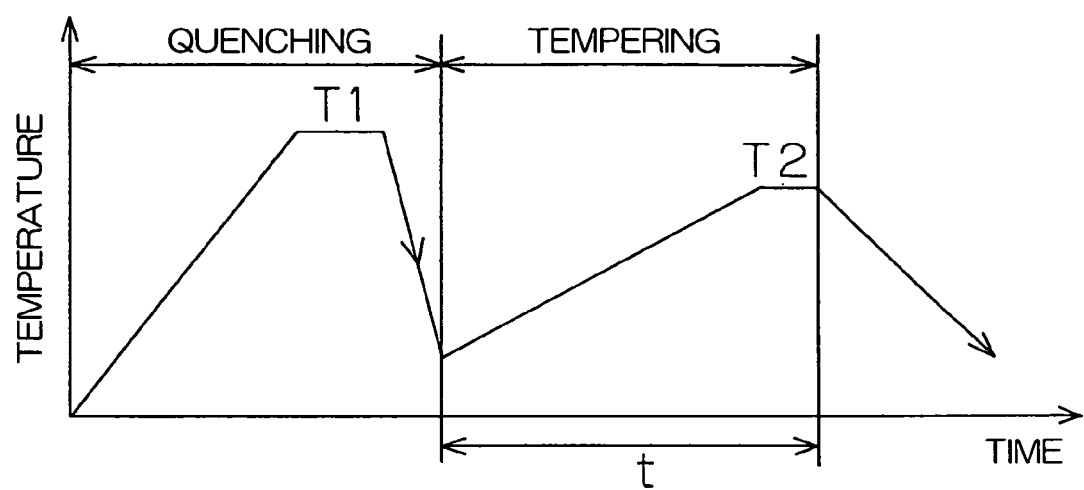
FIG. 1 is a graph showing a relation between a time and a temperature during heating when a steel bar for a steering rack of the present invention is manufactured.

A steel bar for a steering rack of the invention contains 0.50 to 0.60% by mass of C, 0.05 to 0.5% by mass of Si, 0.2 to 1.5% by mass of Mn, 0.0005 to 0.003% by mass of B, 0.005 to 0.05% by mass of Ti, 0.0005 to 0.1% by mass of Al, and 0.002 to 0.02% by mass of N. Preferably, the steel bar also contains 1.5% by mass or less (excluding 0% by mass) of Cr. The rest contains Fe and unavoidable impurities.

Followings are the reason why the components are limited to the ranges as specified above.

The reason why the content of C is set to 0.50% by mass or greater is to enhance the abrasion resistance sufficiently when the steel bar is made into a steering rack (for example, a steering rack for an electric power steering). A preferable content of C is 0.52% by mass or greater. It should be noted, however, that when the content of C is excessively large, the impact resistance of the steering rack is deteriorated. In view of the foregoing, the content of C is set to 0.60% by mass or less, preferably 0.58% by mass or less, and more preferably 0.56% by mass or less.

The reason why the content of Si is set to 0.05% by mass or greater is to perform deoxidation of steel material. The content of Si is preferably 0.10% by mass or greater, in particular, 0.15% by mass or greater. It should be noted, however, that when the content of Si is excessively large, the machinability when forming rack teeth is deteriorated. In view of the foregoing, the content of Si is set to 0.5% by mass or less, preferably 0.35% by mass or less, and more preferably 0.30% by mass or less.

The reason why the content of Mn is set to 0.2% by mass or greater is not only to enhance the strength of the steel material but also to make it easier to introduce a bainitic structure by enhancing the hardenability, so that bending deformability is improved when the steel material is machined into a steering rack. A preferable content of Mn is 0.5% by mass or greater, in particular, 0.7% by mass or greater. It should be noted, however, that when the content of Mn is excessively large, a hardening layer formed through induction quenching becomes so deep that the bending deformability is deteriorated. In view of the foregoing, the content of Mn is set to 1.5% by mass or less, preferably 1.3% by mass or less, and more preferably 1.2% by mass or less.

The reason why the content of B is set to 0.0005% by mass or greater is to ensure the impact resistance with the steel of the present invention that contains an increased amount of C. A preferable content of B is 0.0007% by mass or greater. It should be noted, however, that when the content of B is excessively large, toxic B-based compounds are produced. As a result, the impact resistance is deteriorated rather than enhanced. In view of the foregoing, the content of B is set to 0.003% by mass or less, preferably 0.0025% by mass or less, and more preferably 0.0020% by mass or less.

Ti combines with N in the steel to form TiN, and suppresses the production of BN. Ti is therefore effective to ensure the effects of B as described above. Hence, the content of Ti is set to 0.005% by mass or greater, preferably 0.010% by mass or greater, and more preferably 0.012% by mass or greater. It should be noted, however, that when the content of Ti is excessively large, the impact resistance of the steering rack is deteriorated rather than enhanced. In view of the foregoing, the content of Ti is set to 0.05% by mass or less, preferably 0.04% by mass or less, and more preferably 0.035% by mass or less.

Al and N are contained because it is possible to make austenitic particles finer during induction quenching by forming AlN. The content of Al is 0.0005% by mass or greater, preferably 0.010% by mass or greater, and more preferably 0.020% by mass or greater. The content of N is 0.002% by mass or greater, preferably 0.003% by mass or greater, and more preferably 0.004% by mass or greater. It should be noted, however, that when the contents of Al and N are excessively large, the impact resistance is deteriorated. In view of the foregoing, the content of Al is set to 0.1% by mass or less, preferably 0.08% by mass or less, and more preferably 0.05% by mass or less, and the content of N is set to 0.02% by mass or less, preferably 0.01% by mass or less, and more preferably 0.007% by mass or less.

Cr is contained to enhance the hardenability. The lower limit of the content of Cr is not particularly limited. However, the lower limit is about 0.05% by mass, preferably about 0.08% by mass, and more preferably about 0.10% by mass, for example. It should be noted, however, that when the content of Cr is excessively large, a hardening layer formed through induction quenching becomes so deep that the bending deformability becomes insufficient. In view of the foregoing, the content of Cr is set to, for example, 1.5% by mass or less, preferably 1.0% by mass or less, and more preferably 0.50% by mass or less.

The steel bar for a steering rack of the present invention may contain free-cutting elements (S, Pb, Bi, Te, Mg, Ca, rare-earth elements, Zr, etc.) as needed. Amounts of these free-cutting elements are, for example, as follows: 0.06% by mass or less (excluding 0% by mass) of S, 0.3% by mass or less (excluding 0% by mass) of Pb, 0.2% by mass or less (excluding 0% by mass) of Bi, 0.1% by mass or less (excluding 0% by mass) of Te, 0.01% by mass or less (excluding 0% by mass) of Mg, 0.01% by mass or less (excluding 0% by mass) of Ca, 0.01% by mass or less (excluding 0% by mass) of rare-earth elements (REM), 0.3% by mass or less (excluding 0% by mass) of Zr. These free-cutting elements can be doped either solely or in combination of two or more kinds.

Examples of the rare-earth elements include Sc, Y, La, Ce, Pr, Nd, Pm, Sm, Eu, Gd, Tb, Dy, Ho, Er, Tm, Yb, and Lu.

The steel bar for a steering rack of the invention is adjusted in such a manner that the quenched and tempered structures in a portion of the steel bar at a depth of D/4 (D is a diameter of the steel bar) from the surface will be as set forth in 1), 2), and 3):

1) a sum of a tempered bainitic structure and a tempered martensitic structure (hereinafter, occasionally indicated as [TB+TM]) accounts for 30 to 100% (area percentage);

2) a regenerated perlite structure accounts for 0 to 50% (area percentage); and 3) a sum of the tempered bainitic structure, the tempered martensitic structure, and the regenerated perlite structure (hereinafter, occasionally indicated as [TB+TM+RP]) accounts for 50 to 100% (area percentage).

Hereinafter, a portion of the steel bar at the depth of D/4 from the surface is also referred to simply as the D/4 portion.

The reason why such a structure control is performed will now be described.

The tempered bainitic structure and tempered martensitic structure are the structures that are introduced into the steel bar by quenching and tempering the rolled steel bar, and they are effective to prevent development and penetration of cracking occurring in the induction quenched layer when the steel bar is made into the steering rack.

The steering rack has an extremely hard induction quenched portion (surface layer portion). Hence, when it is bent considerably, cracking readily occurs in the induction quenched layer in the vicinity of the root of the steering teeth (normally, in the vicinity of the D/4 portion). However, when the tempered bainitic structure and the tempered martensitic structure remain at the boundary between the induction quenched portion and a portion to which induction quenching is not applied, it is possible to prevent cracking occurred in the induction quenched layer from developing to the inner portion. This can in turn prevent a breaking of the steering rack itself. This is the reason why a sum of the bainitic structure and the tempered martensitic structure (TB+TM) in the D/4 portion is controlled to account for 30% or greater. Preferably, the sum accounts for 40% or greater and more preferably 50% or greater.

The regenerated perlite structure is the structure introduced into the steel bar in the tempering process, and it is a perlite structure that is distinguished from the perlite structure in the as-rolled steel. The regenerated perlite structure is different from the tempered bainitic structure and the tempered martensitic structure described above in that it is useless to prevent development and penetration of cracking; moreover, when the regenerated perlite structure alone is increased, the bending deformability is deteriorated rather than enhanced. The regenerated perlite structure is therefore controlled to account for 50% or less. Preferably, the regenerated perlite structure accounts for 40% or less, and more preferably 30% or less. When the regenerated perlite structure is decreased, there is a tendency that the impact resistance is enhanced further.

Even when the tempered bainitic structure and the tempered martensitic structure are introduced by means of quenching and tempering, it is impossible to prevent development and penetration of cracking in the presence of the ferrite-perlite structure and a soft ferrite structure in the as-rolled material.

It is therefore necessary to reduce the structures in the as-rolled material. In other words, it is necessary to increase the tempered bainitic structure and the tempered martensitic structure. A sum of the three structures (TB+TM+RP) introduced into the steel bar in the quenching and tempering processes accounts for 50% or greater, preferably 60% or greater, and more preferably 70% or greater.

A diameter of the steel bar for a steering rack of the present invention is not particularly limited. However, by taking into account that it is machined to a steering rack, the diameter is normally about 10 to 40 mm, preferably about 15 to 38 mm, and more preferably about 20 to 36 mm.

The steel bar for a steering rack as described above can be manufactured, for example, by rolling a steel piece having the component compositions as above, and introducing the bainitic structure and the martensitic structure by quenching the resultant steel bar followed by tempering at a high temperature for a short time.

For such a manufacturing method, the heating temperature during quenching is 780° C. or higher, and preferably 800° C. or higher. When the heating temperature during quenching is too low, TB+TM+RP after the tempering tend to be decreased. In addition, because a soft ferrite layer is produced, the strength of the steering rack becomes insufficient. The upper limit of the heating temperature is, for example, about 860° C., and preferably about 850° C. When the heating temperature is too high, the steel bar tends to bend more during quenching.

Cooling conditions of quenching need to be controlled so that a sum of the bainitic structure and the martensitic structure in the D/4 portion, which are introduced into the steel bar by means of quenching, accounts for 30% or greater (area percentage), preferably 40% or greater (area percentage), and more preferably 50% or greater (area percentage). Such controlled-cooling conditions can be set appropriately in response to the compositions of the steel or the like. It is, however, preferable to cool a region at a temperature of about 800 to 300° C. (preferably 750 to 350° C.) at a cooling rate of 30 to 80° C./sec (preferably 40 to 70° C./sec).

For an intermediate body into which the bainitic structure and the martensitic structure thus obtained are introduced, by referring to FIG. 1, tempering is performed for a processing time t, which is 20 min or shorter, and preferably 15 min or shorter including the temperature rising process, followed by cooling with air to room temperature. Ambient temperature T2 of the oven used for tempering is about 660 to 720° C., and preferably about 680 to 700° C.

When the ambient temperature T2 of the oven is set to 660° C. or higher, a Vickers hardness after tempering can be reduced (for example, it can be reduced to 320 HV or lower) by means of tempering for a time as short as or shorter than 20 min. This can enhance the ease of machining when the rack teeth of the steering rack are machined later. The ambient temperature T2 of the oven is preferably 680 to 700° C.

In order to control the tempered structures so that a sum of the tempered bainitic structure and the tempered martensitic structure accounts for 30 to 100% in area percentage, the regenerated perlite structure accounts for 0 to 50% in area percentage, and a sum of the tempered bainitic structure, the tempered martensitic structure, and the regenerated perlite structure accounts for 50 to 100% in area percentage in the D/4 portion 27, it is preferable that the tempering temperature is not too high or the tempering time is not too long under the tempering conditions (660° C. or higher for 20 min or shorter) as specified above.

When the tempering temperature is too high or the tempering time is too long, the bainitic structure and the martensitic structure introduced into the steel bar by means of controlled-cooling are readily reduced in area percentage, while the perlite structure readily regenerates, which results in deterioration of the bending property.

The steel bar for a steering rack of the present invention as above-obtained has excellent impact resistance while the abrasion resistance is improved. Moreover, because it has excellent bending deformability, it is quite useful for a steering rack (in particular, a steering rack for electric power steering).

TEST EXAMPLES 1 to 36

The steel materials made of the components set forth in Tables 1 and 2 below were manufactured, and rolled to form steel bars having a diameter of 30 mm. Subsequently, the steel bars were quenched by heating to temperatures set forth in Tables 1 and 2 below followed by controlled-cooling to room temperature. The structures of the steel bars were controlled by changing an amount of water and a cooling time under the controlled-cooling. The cooled steel bars were tempered as they were retained in the oven heated to the ambient temperatures set forth in Tables 1 and 2 below for times set forth in Tables 1 and 2 below. The tempered steel bars were allowed to stand for cooling.

The structures in the D/4 portion of each quenched steel bar, and the structures in the D/4 portion of each tempered steel bar were observed using an electronic microscope (magnification of 5000 times), and the area percentages of the martensitic structure and the bainitic structure as well as the tempered martensitic structure, the tempered bainitic structure, and the regenerated perlite structure were found.

Test Examples 1 through 19 are within the technical scope of the present invention because both the components and the structures are appropriate. Test Examples 20 to 36 are out of the technical scope of the present invention because at least one of the components and the structures are inappropriate.

Tests as follows were performed to check the breaking resistance (bending deformability), the impact resistance, and the abrasion resistance when the tempered steel bars were made into steering racks.

Bending Test

After each tempered steel bar was machined to have a diameter of 27.5 mm by means of drawing, the rack teeth were formed by cutting. A depth of the rack teeth was about D/4. Subsequently, the steering rack was prepared by subjecting the teeth portion to induction quenching under the conditions set forth as follows.

Induction Quenching Conditions
  coil used: for use of surface quenching
  (diameter: 40 mm, thickness: 2 mm)
  voltage: 4.0 kV
  current: 4.5 A
  frequency: 40 kHz
  heating method: mobile quenching
  (moving rate: 3.0 mm/sec)
  cooling: mixed solvent of soluble oil and water A 3-point bending test was performed using the steering rack thus obtained by giving 400 mm as a distance between supporting points and setting the pressing points on the opposite side of the teeth of the steering rack. The evaluation was made according to the criteria as follows:

x: cracking occurring in the induction quenched layer developed and penetrated to the inner portion and the steering rack was broken into two pieces; and o: cracking stopped in the middle and the steering rack did not break.

Impact Test

After each tempered steel bar was machined to have a diameter of 27.5 mm by means of drawing, a JIS3 type U notch test piece was cut out from the D/4 portion, and the surface layer on the notch forming side was subjected to induction quenching. Conditions for induction quenching were the same as those of the bending test except that the moving rate was 3.5 mm/sec. The Charpy impact test (test temperature: room temperature) was performed using the test piece thus obtained according to JIS-Z2242 to find an impact value.

Abrasion Test

Circular plates having the same characteristics as those of the tempered steel bars obtained in the test examples were prepared. To be more specific, the steel materials made of the same components as those of the steel bars in the test examples were manufactured. The steel materials were subjected to extend forging through hot forging to have a diameter of 53 mm. After the steel materials were cut into circular plates having a thickness of 15 mm, quenching and tempering were performed under the same conditions as those in the respective test examples.

Figure 2:
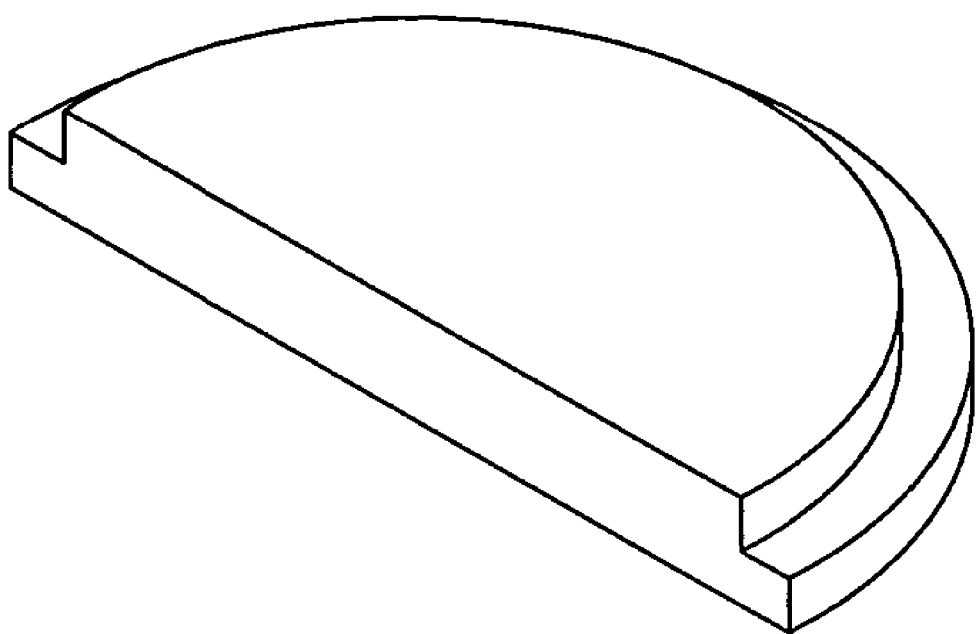
FIG. 2 is a perspective view schematically showing a shape of a test disk used in test examples.

Subsequently, each circular plate was machined into a 2-step semi-circular plate (the diameter of the top stage: 44 mm, the thickness of the top stage: 3 mm, the diameter of the bottom state; 50 mm, the thickness of the bottom stage: 5 mm) as is shown in FIG. 2. The surface layer of the top stage was subjected to induction quenching. The conditions of the induction quenching were the same as those of the bending test except that the moving rate was 2.5 mm/sec. The pin on disk abrasion test was performed on test disk thus obtained, and an abrasion decreased amount of each test piece was measured. The detailed conditions of the abrasion test were as follows:
  lubrication: dry type
  surface roughness of test piece: Ra 0.25 μm
  peripheral velocity: 0.05 m/sec
  contact pressure: 0.05 GPa
  pin: SUJ2 (diameter: 5 mm, Rockwell hardness (HRC): 64)

The results are set forth in Tables 1 and 2 below.

TABLE 1

| Test Examples | Composition of Steel Material (unit = % by mass: the rest are Fe and unavoidable impurities) | | | | | | | | Quenching | | Tempering | |
|---|---|---|---|---|---|---|---|---|---|---|---|---|
| | | | | | | | | | Heating Temperature (°C.) | Structure [B + M] (% of area) | Oven Temperature | Retention Time (min) |
| | C | Si | Mn | B | Ti | Cr | Al | N | | | | |
| 1 | 0.52 | 0.20 | 0.83 | 0.0016 | 0.021 | — | 0.041 | 0.0040 | 810 | 90 | 690 | 10 |
| 2 | 0.56 | 0.18 | 0.89 | 0.0014 | 0.022 | — | 0.040 | 0.0042 | 810 | 90 | 690 | 10 |
| 3 | 0.53 | 0.19 | 1.06 | 0.0012 | 0.023 | — | 0.048 | 0.0049 | 820 | 90 | 690 | 10 |
| 4 | 0.54 | 0.22 | 0.72 | 0.0017 | 0.020 | — | 0.040 | 0.0044 | 820 | 90 | 690 | 10 |
| 5 | 0.54 | 0.24 | 0.88 | 0.0008 | 0.022 | — | 0.041 | 0.0042 | 820 | 90 | 690 | 10 |
| 6 | 0.53 | 0.24 | 0.76 | 0.0018 | 0.022 | — | 0.045 | 0.0044 | 830 | 90 | 690 | 10 |
| 7 | 0.54 | 0.20 | 0.75 | 0.0010 | 0.015 | — | 0.048 | 0.0047 | 820 | 90 | 690 | 10 |
| 8 | 0.53 | 0.22 | 0.82 | 0.0014 | 0.023 | — | 0.040 | 0.0041 | 820 | 90 | 690 | 10 |
| 9 | 0.54 | 0.23 | 0.83 | 0.0011 | 0.022 | 0.13 | 0.050 | 0.0041 | 830 | 90 | 690 | 10 |
| 10 | 0.54 | 0.24 | 0.82 | 0.0016 | 0.020 | 0.21 | 0.048 | 0.0046 | 820 | 90 | 690 | 10 |
| 11 | 0.53 | 0.24 | 0.86 | 0.0013 | 0.021 | — | 0.049 | 0.0041 | 820 | 90 | 690 | 10 |
| 12 | 0.54 | 0.21 | 0.75 | 0.0014 | 0.022 | — | 0.042 | 0.0049 | 830 | 80 | 690 | 10 |
| 13 | 0.53 | 0.23 | 0.73 | 0.0012 | 0.022 | — | 0.048 | 0.0043 | 830 | 70 | 690 | 10 |
| 14 | 0.53 | 0.24 | 0.74 | 0.0013 | 0.021 | — | 0.046 | 0.0045 | 820 | 60 | 690 | 10 |
| 15 | 0.53 | 0.20 | 0.83 | 0.0011 | 0.021 | — | 0.047 | 0.0044 | 810 | 90 | 690 | 10 |
| 16 | 0.54 | 0.23 | 0.84 | 0.0012 | 0.021 | — | 0.040 | 0.0041 | 820 | 90 | 690 | 5 |

TABLE 1-continued

| | C | Si | Mn | B | Ti | Cr | Al | N | Heating Temperature (°C.) | [B + M] (% of area) | Oven Temperature | Retention Time (min) |
|---|---|---|---|---|---|---|---|---|---|---|---|---|
| 17 | 0.55 | 0.24 | 0.86 | 0.0013 | 0.022 | — | 0.048 | 0.0047 | 820 | 90 | 720 | 10 |
| 18 | 0.54 | 0.21 | 0.86 | 0.0010 | 0.022 | — | 0.047 | 0.0049 | 840 | 90 | 690 | 10 |
| 19 | 0.53 | 0.22 | 0.77 | 0.0013 | 0.022 | — | 0.040 | 0.0044 | 820 | 90 | 690 | 10 |

| Test Examples | Tempering Structure [TB + TM] (% of area) | Structure [RP] (% of area) | Structure [TB + TM + RP] (% of area) | Bending Test | Impact Value | Quantity of Abrasion |
|---|---|---|---|---|---|---|
| 1 | 90 | 0 | 90 | ○ | 56 | 10 |
| 2 | 90 | 0 | 90 | ○ | 51 | 6 |
| 3 | 90 | 0 | 90 | ○ | 52 | 8 |
| 4 | 90 | 0 | 90 | ○ | 54 | 7 |
| 5 | 90 | 0 | 90 | ○ | 51 | 7 |
| 6 | 90 | 0 | 90 | ○ | 52 | 6 |
| 7 | 90 | 0 | 90 | ○ | 53 | 7 |
| 8 | 90 | 0 | 90 | ○ | 53 | 6 |
| 9 | 90 | 0 | 90 | ○ | 53 | 7 |
| 10 | 90 | 0 | 90 | ○ | 54 | 8 |
| 11 | 90 | 0 | 90 | ○ | 52 | 9 |
| 12 | 80 | 0 | 80 | ○ | 51 | 8 |
| 13 | 70 | 0 | 70 | ○ | 51 | 8 |
| 14 | 60 | 0 | 60 | ○ | 52 | 8 |
| 15 | 90 | 0 | 90 | ○ | 53 | 7 |
| 16 | 90 | 0 | 90 | ○ | 52 | 8 |
| 17 | 70 | 20 | 90 | ○ | 50 | 7 |
| 18 | 90 | 0 | 90 | ○ | 53 | 7 |
| 19 | 90 | 0 | 90 | ○ | 51 | 8 |

[B + M] indicates a sum of a bainitic structure and a martensitic structure,
[TB + TM] indicates a sum of tempered bainitic structure and martensitic structure, and
[RP] indicates a regenerated perlite structure.
[TB + TM + RP] indicates a sum of a tempered bainitic structure, a tempered martensitic structure, and a regenerated perlite structure.

TABLE 2

| Test Examples | Composition of Steel Material (unit = % by mass: the rest are Fe and unavoidable impurities) | | | | | | | | Quenching Heating Temperature (°C.) | Structure [B + M] (% of area) | Tempering Oven Temperature | Retention Time (min) |
|---|---|---|---|---|---|---|---|---|---|---|---|---|
| | C | Si | Mn | B | Ti | Cr | Al | N | | | | |
| 20 | 0.46 | 0.23 | 0.82 | 0.0017 | 0.022 | — | 0.042 | 0.0043 | 820 | 90 | 690 | 10 |
| 21 | 0.64 | 0.22 | 0.76 | 0.0011 | 0.021 | — | 0.044 | 0.0041 | 830 | 90 | 690 | 10 |
| 22 | 0.55 | 0.21 | 0.12 | 0.0015 | 0.022 | — | 0.045 | 0.0043 | 810 | 10 | 690 | 10 |
| 23 | 0.53 | 0.24 | 1.60 | 0.0017 | 0.020 | — | 0.050 | 0.0045 | 830 | 90 | 690 | 10 |
| 24 | 0.53 | 0.21 | 0.82 | 0.0002 | 0.023 | — | 0.046 | 0.0048 | 830 | 90 | 690 | 10 |
| 25 | 0.54 | 0.21 | 0.82 | 0.0054 | 0.021 | — | 0.050 | 0.0048 | 830 | 90 | 690 | 10 |
| 26 | 0.54 | 0.23 | 0.79 | 0.0014 | 0.002 | — | 0.049 | 0.0047 | 840 | 90 | 690 | 10 |
| 27 | 0.55 | 0.22 | 0.88 | 0.0013 | 0.113 | — | 0.041 | 0.0045 | 810 | 90 | 690 | 10 |
| 28 | 0.54 | 0.22 | 0.85 | 0.0014 | 0.022 | 1.64 | 0.044 | 0.0042 | 830 | 90 | 690 | 10 |
| 29 | 0.54 | 0.21 | 0.86 | 0.0013 | 0.021 | — | 0.050 | 0.0045 | 820 | 20 | 690 | 10 |
| 30 | 0.53 | 0.22 | 0.83 | 0.0014 | 0.024 | — | 0.043 | 0.0041 | 810 | 20 | 730 | 10 |
| 31 | 0.55 | 0.23 | 0.80 | 0.0012 | 0.023 | — | 0.043 | 0.0048 | — | 0 | — | — |
| 32 | 0.53 | 0.22 | 0.79 | 0.0014 | 0.020 | — | 0.044 | 0.0041 | 840 | 90 | 750 | 5 |
| 33 | 0.54 | 0.22 | 0.78 | 0.0014 | 0.023 | — | 0.041 | 0.0042 | 830 | 90 | 750 | 10 |
| 34 | 0.53 | 0.23 | 0.79 | 0.0012 | 0.022 | — | 0.042 | 0.0043 | 830 | 90 | 740 | 30 |
| 35 | 0.53 | 0.21 | 0.74 | 0.0013 | 0.022 | — | 0.042 | 0.0049 | 760 | 40 | 690 | 10 |
| 36 | 0.54 | 0.20 | 0.74 | 0.0014 | 0.022 | — | 0.045 | 0.0045 | 750 | 30 | 690 | 10 |

| Test Examples | Tempering Structure [TB + TM] (% of area) | Structure [RP] (% of area) | Structure [TB + TM + RP] (% of area) | Bending Test | Impact Value | Quantity of Abrasion |
|---|---|---|---|---|---|---|
| 20 | 90 | 0 | 90 | ○ | 61 | 62 |
| 21 | 90 | 0 | 90 | ○ | 16 | 5 |
| 22 | 10 | 0 | 10 | X | 51 | 7 |
| 23 | 90 | 0 | 90 | X | 53 | 9 |

TABLE 2-continued

| | | | | | | |
|---|---|---|---|---|---|---|
| 24 | 90 | 0 | 90 | ○ | 23 | 8 |
| 25 | 90 | 0 | 90 | ○ | 14 | 7 |
| 26 | 90 | 0 | 90 | ○ | 26 | 7 |
| 27 | 90 | 0 | 90 | ○ | 24 | 5 |
| 28 | 90 | 0 | 90 | X | 52 | 8 |
| 29 | 20 | 0 | 20 | X | 51 | 8 |
| 30 | 10 | 40 | 50 | X | 18 | 9 |
| 31 | 0 | 0 | 0 | X | 21 | 6 |
| 32 | 30 | 60 | 90 | X | 10 | 9 |
| 33 | 10 | 70 | 80 | X | 15 | 8 |
| 34 | 10 | 60 | 70 | X | 17 | 7 |
| 35 | 40 | 0 | 40 | X | 52 | 8 |
| 36 | 30 | 0 | 30 | X | 51 | 8 |

[B + M] indicates a sum of a bainitic structure and a martensitic structure,
[TB + TM] indicates a sum of tempered bainitic structure and martensitic structure, and
[RP] indicates a regenerated perlite structure.
[TB + TM + RP] indicates a sum of a tempered bainitic structure, a tempered martensitic structure, and a regenerated perlite structure.

Of the test examples set forth in Table 2, Test Examples 20 through 28 are cases where the component designs are inappropriate. To be more specific, an amount of C is insufficient in Test Example 20, which results in insufficient abrasion resistance. On the contrary, an amount of C is excessively large in Test Example 21, which results in insufficient impact resistance.

In Test Example 22, because the quenching property is poor due to a small amount of Mn, a sum of the tempered bainitic structure and the tempered martensitic structure is insufficient, which results in an insufficient bending deformability.

In Test Example 23, because an amount of Mn is excessively large, too deep a hardening layer was formed during the induction quenching, which results in an insufficient bending deformability.

In Test Examples 24 through 27, because an amount of B or Ti is inadequate, the impact resistance is insufficient.

In Test Example 28, because an amount of Cr is excessively large, too deep a hardening layer was formed during the induction quenching, which results in an insufficient deformability.

Also, as is obvious from Test Examples 29 through 36, even when the component designs are appropriate, various characteristics become insufficient when the structures are inappropriate. To be more specific, in Test Examples 29 through 31, a sum of the tempered bainitic structure and the tempered martensitic structure is insufficient, which results in an insufficient bending deformability.

In Test Examples 32 through 34, the regenerated perlite structure is more than necessary, which results in an insufficient bending deformability. In Test Examples 35 and 36, a sum of the tempered bainitic structure, the tempered martensitic structure, and the regenerated perlite structure is insufficient, which results in an insufficient bending deformability.

On the contrary, in Test Examples 1 through 19, because both the component designs and the structures are appropriate, both the impact resistance and the abrasion resistance are excellent. Moreover, it is possible to prevent development and penetration of cracking.

According to the steel bar for a steering rack of the present invention, because both the components and the structures are controlled in an appropriate manner, the impact resistance is excellent while the abrasion resistance is improved; moreover, it is possible to prevent development and penetration of cracking.

Figure 3:
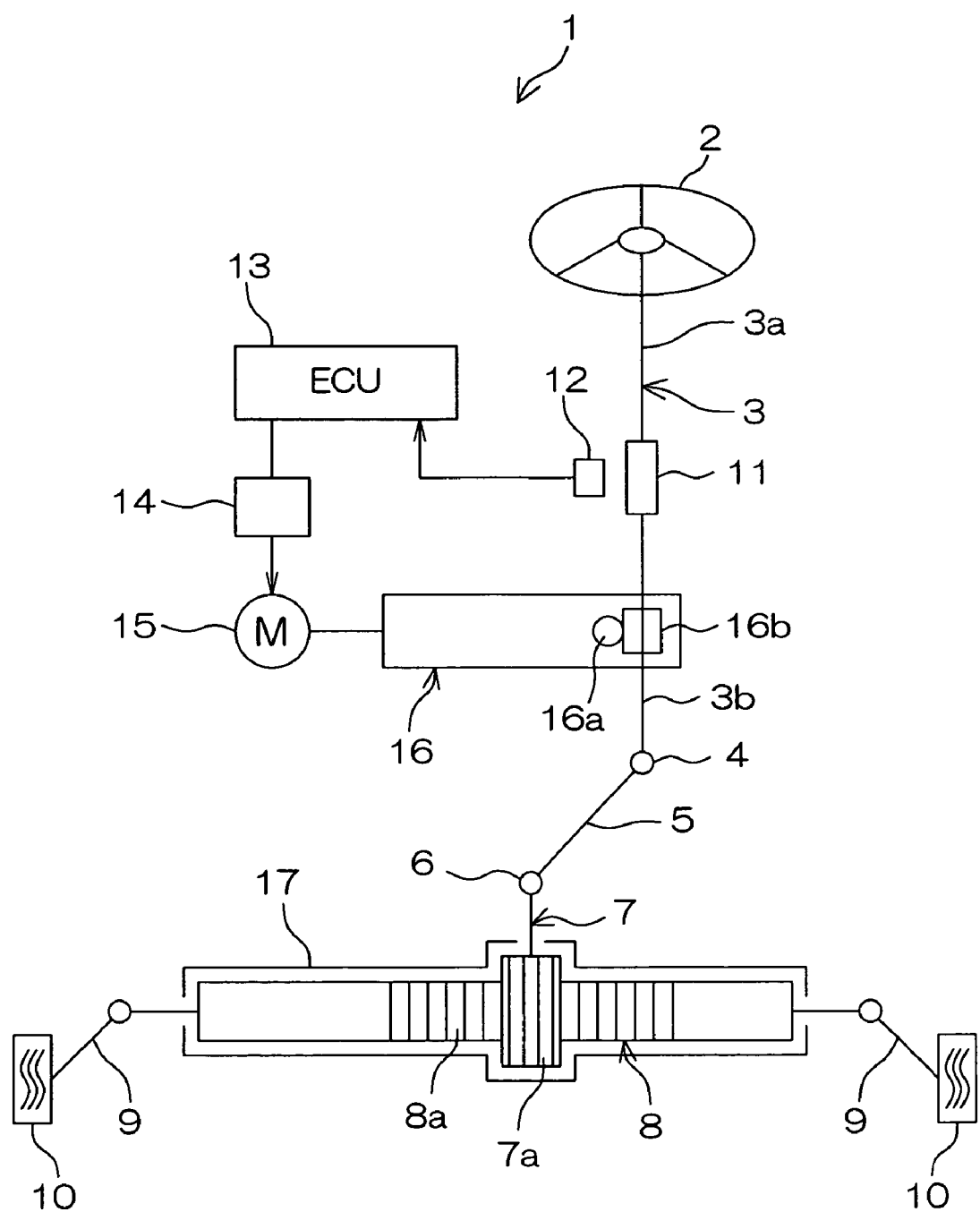
FIG. 3 is a view schematically showing the configuration of an electric power steering system including a steering rack according to one embodiment of the invention.

FIG. 3 is a view schematically showing the configuration of an electric power steering system including a steering rack using the steel bar for a steering rack of the present invention described above.

Referring to FIG. 3, an electric power steering system (EPS) 1 includes a steering shaft 3 linked to a steering member 2, such as a steering wheel, an intermediate shaft 5 linked to the steering shaft 3 via a universal joint 4, a pinion shaft 7 linked to the intermediate shaft 5 via a universal joint 6, and a steering rack 8 serving as a steering shaft that extends in the crosswise direction of a vehicle and provided with rack teeth 8a that engage with a pinion 7a formed at the tip end of the pinion shaft 7.

The steering rack 8 is supported on a housing 17 fixed to the vehicle body via unillustrated plural bearings in such a manner that linear reciprocation is allowed. A pair of end portions of the steering rack 8 extends toward the both ends of the housing 17, and a tie rod 9 is connected to each end. Each tie rod 9 is linked to a corresponding steerable wheel 10 for steering via a steering knuckle arm (not shown).

When the steering shaft 3 starts to rotate as the steering member 2 is manipulated, the rotation is converted to linear motions of the steering rack 8 along the crosswise direction of the vehicle by the pinion 7a and the rack teeth 8a. The steerable wheels 10 for steering is thus achieved.

The steering shaft 3 is divided to an input shaft 3a continued to the steering member 2, and an output shaft 3b continued to the pinion shaft 7. These input and output shafts 3a and 3b are linked to each other on the same axial line via a torsion bar 11 so that they are able to rotate relatively with respect to each other.

When the torsion bar 11 is interposed, a torque sensor 12 is provided, which detects steering torque on the basis of a quantity of relative rotation displacement between the input and output shafts 3a and 3b. The torque detection result of the torque sensor 12 is provided to an ECU (Electronic Control Unit) 13. The ECU 13 controls the driving of an electric motor 15 that assists steering via a driving circuit 14 on the basis of the torque detection result and a vehicle speed detection result provided from an unillustrated vehicle speed sensor.

The output rotation of the electric motor 15 is reduced via a deceleration mechanism 16 and transmitted to the pinion shaft 7 via the output shaft 3b and the intermediate shaft 5. The output rotation is then converted to linear motions of the steering rack 8 to assist the steering.

An example of the deceleration mechanism is a gear mechanism including a pinion 16a, such as a worm shaft, linked to an unillustrated rotating shaft of the electric motor 15 to be able to integrally rotate, and a gear 16b, such as a worm wheel, engaged with the pinion 16a and linked to the output shaft 3b to be able to integrally rotate.

Figure 4A:
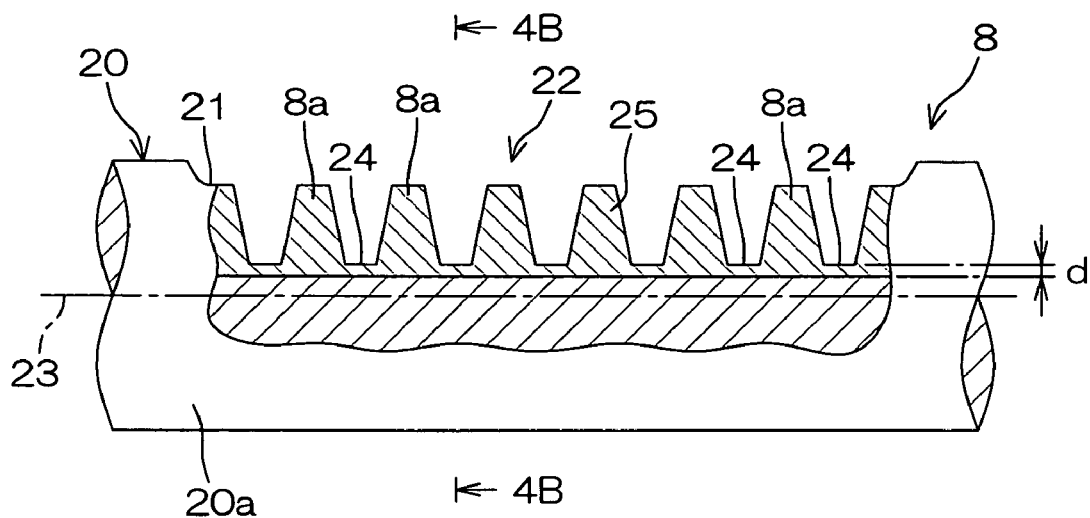
FIG. 4A is a partially broken side elevation of the steering rack.
Figure 4B:
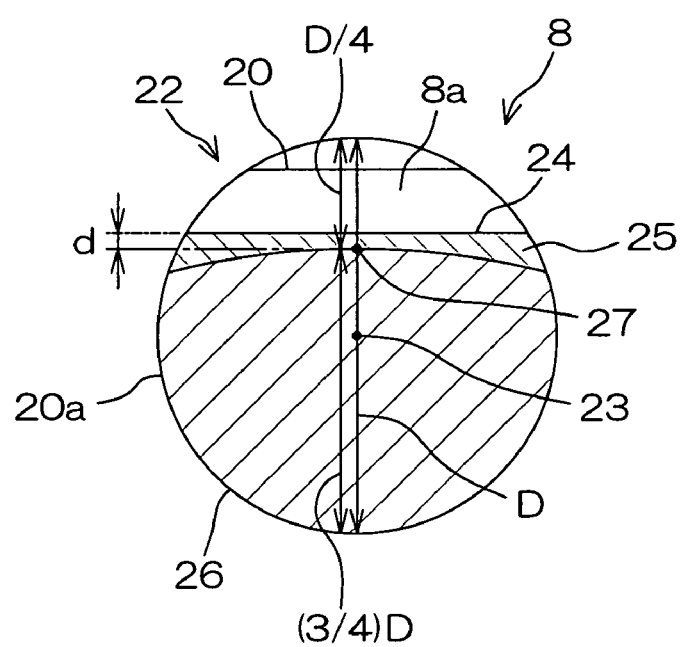
FIG. 4B is a cross section taken along the line 4B-4B of FIG. 4A.

FIG. 4A is a partial sectional side elevation of the steering rack 8, and FIG. 4B is a cross section taken along the line 4B-4B of FIG. 4A. The steering rack 8 includes a main body 20 shaped like a round bar having a diameter D, a flat portion 21 provided to a part of the peripheral surface 20a of the main body 20, and a rack teeth forming portion 22 provided to the flat portion 21.

The flat portion 21 extends along an axial line 23 of the main body 20 as long as a predetermined length and has a predetermined width. The rack teeth forming portion 22 includes the plural rack teeth 8a described above and teeth bottom portions 24 provided between adjacent rack teeth 8a.

The steering rack 8 is formed using the steel bar for a steering rack of the present invention described above. More specifically, the steel bar for a steering rack used for the steering rack 8 contains 0.50 to 0.60% by mass of C, 0.05 to 0.5% by mass of Si, 0.2 to 1.5% by mass of Mn, 0.0005 to 0.003% by mass of B, 0.005 to 0.05% by mass of Ti, 0.0005 to 0.1% by mass of Al, and 0.002 to 0.02% by mass of N.

Also, given D as the diameter of the steel bar, then the quenched and tempered structures in a portion of the steel bar at the depth of D/4 from the surface satisfy conditions I), II), and III) as follows:

I) a sum of the tempered bainitic structure and the tempered martensitic structure accounts for 30 to 100% in area percentage;

II) the regenerated perlite structure accounts for 0 to 50% in area percentage; and III) a sum of the tempered bainitic structure, the tempered martensitic structure, and the regenerated perlite structure accounts for 50 to 100% in area percentage.

For the steel bar for a steering rack from which the steering rack 8 is formed, it is preferable to contain 1.5% by mass or less (excluding 0% by mass) of Cr.

Also, for the steel bar for a steering rack from which the steering rack 8 is formed, it is preferable to further contain at least one kind from 0.06% by mass or less (excluding 0% by mass) of S, 0.3% by mass or less (excluding 0% by mass) of Pb, 0.2% by mass or less (excluding 0% by mass) of Bi, 0.1% by mass or less (excluding 0% by mass) of Te, 0.01% by mass or less (excluding 0%) of Mg, 0.01% by mass or less (excluding 0% by mass) of Ca, 0.01% by mass or less (excluding 0% by mass) of rare-earth elements, and 0.3% by mass or less (excluding 0% by mass) of Zr.

As has been described, the content of carbon in the steel forming the steering rack 8 is 0.50 to 0.60% by mass. The content of carbon is set to 0.50% by mass in order to enhance the abrasion resistance of the rack teeth 8a by subjecting the steel material to induction quenching described below. It should be noted, however, that when the content of carbon exceeds 0.60% by mass, the impact resistance of the steering rack 8 is deteriorated, and quenching cracking readily occurs during induction heat treatment. In view of the foregoing, the content of carbon is set to 0.60% by mass or less, preferably 0.58% by mass or less, and more preferably 0.56% by mass or less.

Steel forming the steering rack 8 contains 5 to 30 ppm of B. By doping 5 ppm or more of B, it is possible to reinforce the grain boundary in the portion having undergone induction quenching, so that the bending deformability (breaking resistance) can be enhanced markedly with an increase of the ductility. However, the effects saturate when 30 ppm or more of B is doped. It is therefore preferable to set the concentration of B in a range from 5 to 30 ppm.

In the steering rack 8, a hardening layer 25 is provided at least to the rack teeth forming portion 22 by means of induction quenching and tempering performed after the rack teeth 8a are formed. The surface hardness of the rack teeth forming portion 22 is set to 680 to 800 HV in Vickers hardness.

When the hardness is lower than 680 HV, the surface hardness of the rack teeth forming portion 22 becomes insufficient, and the fatigue limit of bending fatigue is lowered. Meanwhile, when the hardness exceeds 800 HV, the ductility of the surface layer is deteriorated, and the bending strength against the static load or the quasi-static load becomes insufficient.

Hence, the fatigue limit of bending fatigue is raised and the sufficient bending strength against the static or quasi-static load is ensured by setting the surface hardness of the rack teeth forming portion to 680 to 800 HV.

In the rack teeth forming portion 22, it is preferable that an effective case hardened depth d of the hardening layer 25 on the teeth bottom portions 24 between the rack teeth 8a is in a range of 0.1 to 1.5 mm from the surface of the teeth bottom portion 24. The effective case hardened depth d of the hardening layer 25 referred to herein is defined as a distance from the surface to the position at which the hardness reaches 450 HV, and it is equivalent to the effective case hardened depth.

When the effective case hardened depth d of the hardening layer 25 on the teeth bottom portions 24 exceeds 1.5 mm, there is a tendency that the steering rack 8 causes local bending curvature at one point in the intermediate portion in the longitudinal direction and bends in an angular shape upon application of a large impact. This may cause the steering rack 8 to become unable to move on the pinion 7a. Conversely, when the effective case hardened depth d of the hardening layer 25 is less than 0.1 mm, there is a possibility that the bending strength near the teeth roots of the rack teeth 8a becomes insufficient.

Hence, the entire steering rack 8 is allowed to bend gently upon application of a large load while ensuring the bending strength at the teeth roots of the rack teeth 8a by setting the effective case hardened depth d of the hardening layer 25 on the teeth bottom portions 24 to a range of 0.1 to 1.5 mm. The steering performance in an emergency is thus ensured. The effective case hardened depth d of the hardening layer 25 on the teeth bottom portions 24 is preferably 0.3 to 1.2 mm.

Normally, the rack teeth 8a are formed so that the teeth bottom portions are located at the depth of about D/4. Hence, on the peripheral surface 20a of the main body 21, a portion 27 (also referred to as the (¾)D portion 27) having a depth of (¾)D from the surface of a portion 26 opposing the rack teeth forming portion 22 in the radius direction is present almost at the boundary between the quenched portion and the non-quenched portion.

In the (¾)D portion 27, it is set in such a manner that a sum of the tempered bainitic structure and the tempered martensitic structure accounts for 30 to 100% in area percentage, the regenerated perlite structure accounts for 0 to 50% in area percentage, and a sum of the tempered bainitic structure, the tempered martensitic structure, and the regenerated perlite structure accounts for 50 to 100% in area percentage. This configuration can be observed from an electronic microscopic photograph of the cut section of the steering rack 8.

Should cracking occur in a part of the rack bar upon reception of a large load and the rack bar undergoes bending deformation excessively, the tempered bainitic structure and the tempered martensitic structure that remain in the (¾)D portion and account for 30% in area percentage prevent propagation of cracking. This can in turn prevent a breaking such that the rack bar is broken into two pieces. In addition, the reason why the regenerated perlite structure is controlled to account for 50% or less in area percentage in the (¾)D portion is to prevent deterioration of the ductility.

It is preferable that no residual ferrite is produced in a region at the depth of up to 0.1 mm from the surface of the teeth bottom portions 24. When the residual ferrite is produced, there is a possibility that the strength is deteriorated locally. This configuration is therefore preferable in eliminating such a possibility.

A manufacturing method of the steering rack 8 will now be described. The flat portion 21 is formed by applying milling to a part of the peripheral surface of the steel bar for a steering rack of the present invention having the component compositions and the structures (for example, the component compositions and the structures of Test Examples 1 through 19) as described above. Subsequently, the rack teeth forming portion 22 including the plural rack teeth 8a is formed by applying broaching to the flat portion 21. The rack teeth forming portion 22 is then subjected to induction quenching under the conditions that, for example, the heating time is 5.5 sec and a cooling time with water is 10 sec, after which tempering is performed under the conditions, for example, at 170° C. for 1.5 hours, so that the surface of the rack teeth forming portion 22 reaches 680 to 800 HV in Vickers hardness. The steering rack 8 is thus formed.

The steering rack 8 obtained in this manner is able to ensure the necessary abrasion resistance and the necessary bending strength for the rack teeth 8a as has been described above. In addition, because the tempered bainitic structure and the tempered martensitic structure remaining in the (¾)D portion 27 prevent propagation of cracking to the inner portion, it is possible to prevent a breaking such that breaks the steering rack 8 into two pieces.

Moreover, by setting the effective case hardened depth d of the hardening layer 25 on the bottom teeth portions 24 from the surface of the bottom teeth portions 24 to 0.1 to 1.5 mm, the entire steering rack 8 is allowed to bend gently under application of a large load while ensuring the bending strength at the teeth roots. It is thus possible to ensure the steering performance in an emergency. The effective case hardened depth d from the surface of the teeth bottom portions 24 is preferably 0.3 to 1.2 mm.

The steering rack of the present invention will be described more concretely using an example.

EXAMPLE

A steel material containing 0.53% by mass of C, 0.23% by mass of Si, 0.8% by mass of Mn, 0.018% by mass of S, 0.30% by mass of Cr, and 0.015% by mass of B was rolled to form a steel bar having a diameter of 30 mm. The steel bar was then heated at a heating temperature of 780° C. followed by controlled-cooling to room temperature. The cooled steel bar was tempered by being retained in an oven heated at the ambient temperature of 660° C. for 15 min. The tempered steel bar was allowed to stand for cooling. More preferably, the heating temperature is 820° C., and the ambient temperature during tempering is 690° C.

The steel bar thus obtained was machined to have a diameter of 27.5 mm by means of drawing, after which the flat portion 21 was formed by means of cutting. The rack teeth 8a were then formed in the flat portion 21. The rack teeth forming portion 22 was thus formed. Subsequently, the rack teeth forming portion 22 was subjected to induction quenching under the conditions that the heating time was 5.5 sec and the cooling time with water was 10 sec. Tempering was then performed under the conditions, that is, at 170° C. for 1.5 hours, to provide the hardening layer 25 in the rack teeth forming portion 22. The rack bar of the example was thus manufactured.

In the example, the surface hardness of the rack teeth forming portion 22 was 710 HV. In the portion 27 at the depth (¾)D from the surface of the back surface portion 26 in the rack teeth forming portion 22, a sum of the tempered bainitic structure and the tempered martensitic structure accounted for 90% in area percentage and the regenerated perlite structure accounted for 0% in area percentage. The effective thickness d of the hardening layer 25 on the teeth bottom portions 24 in the rack teeth forming portion 22 from the surface of the teeth bottom portion 24 was 0.7 mm.

COMPARATIVE EXAMPLE

A steel material containing 0.46% by mass of C, 0.19% by mass of Si, 0.86% by mass of Mn, 0.053% by mass of S, and 0.13% by mass of Cr, and excluding B was rolled to form a steel bar. The steel bar was then heated at a heating temperature of 850° C. followed by cooling to room temperature. The cooled steel bar was tempered by being retained in an oven heated at the ambient temperature of 610° C. for 30 min or longer. The tempered steel bar was allowed to stand for cooling. A steering rack of comparative example was manufactured using the steel bar obtained in this manner and in the same manner as in the example above after that.

In the comparative example, the rack teeth forming portion was subjected to normal induction quenching and tempering. The surface hardness of the rack teeth was 650 HV. A sum of the tempered bainitic structure and the tempered martensitic structure in the (¾)D portion accounted for 70% in area percentage, and the regenerated perlite structure accounted for 20% in area percentage. The effective depth of the hardening layer on the teeth bottom portions from the surface of the teeth bottom portions was 0.3 mm.

Tests as follows were performed using two steering racks of the example and two steering racks of the comparative example.

Normal Input Static Breaking Test

Figure 5:
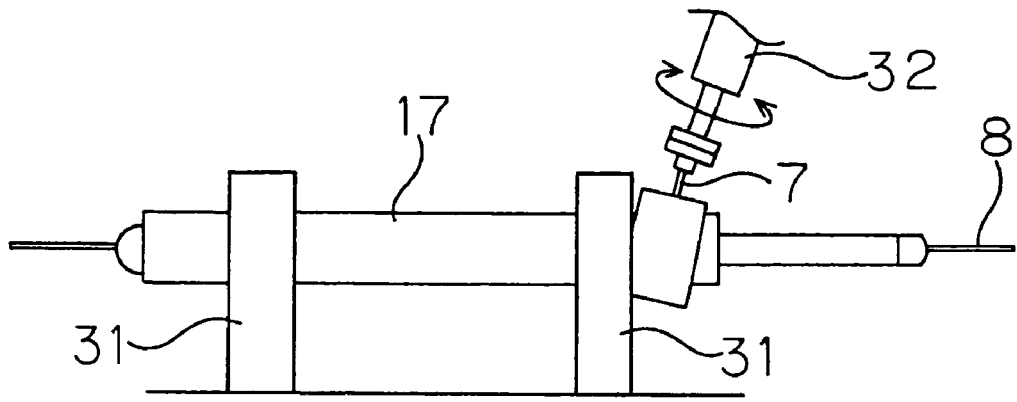
FIG. 5 is a view schematically showing a test device of a normal input static breaking test.

A test device as shown in FIG. 5 was used. The steering racks 8 of the example and the steering racks of the comparative example were individually incorporated into the housing 17. The both ends of the housing 17 were fixed to fixing pillars 31. The steering rack 8 was fixed at the neutral position, and driving torque was provided to the pinion shaft 7 from a rotary actuator 32 linked to the pinion shaft 7. The driving torque was kept increased until a breaking occurred.

The load at which cracking occurred in the steering rack was 305 J in the example, whereas it was 188 J in the comparative example. It is therefore understood that the breaking strength in the example is increased by about 62% in comparison with the breaking strength in the comparative example.

Inverse Input Static Breaking Test

Figure 6:
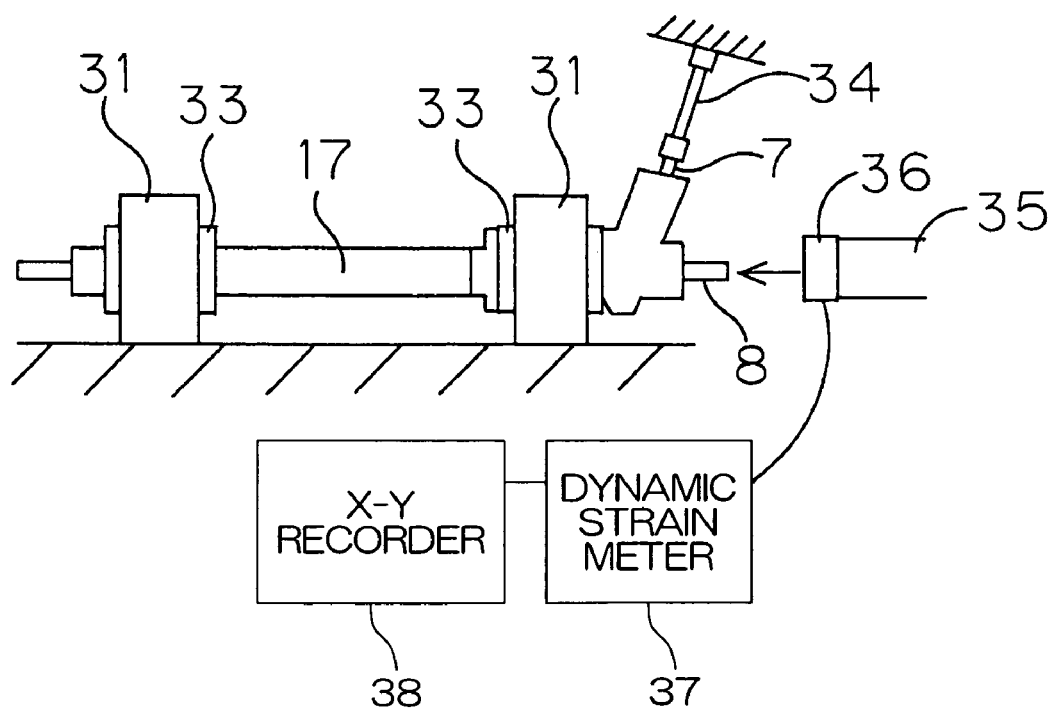
FIG. 6 is a view schematically showing a test device of an inverse input static breaking test.

A test device as shown in FIG. 6 was used. The steering racks 8 of the example and the steering racks of the comparative example were individually incorporated into the housing 17. The both ends of the housing 17 were fixed to fixing pillars 31 via mount rubbers 33. The pinion shaft 7 was fixed at the neutral position via a joint 34, and the end of the steering rack 8 was pushed by a load cylinder 35 via a load cell 36. The load was kept applied until a sound indicating the occurrence of a breaking was confirmed. An output from a dynamic strain meter 37 connected to the load cell 36 was recorded in a recorder 38.

As a result, the load at which a breaking occurred was 92 N·m on average in the example, whereas the load at which a breaking occurred was 51 N·m on average in the comparative example. It is therefore understood that the breaking strength in the example is increased by about 80% in comparison with the breaking strength in the comparative example.

Inverse Input Impact Breaking Test

Figure 7:
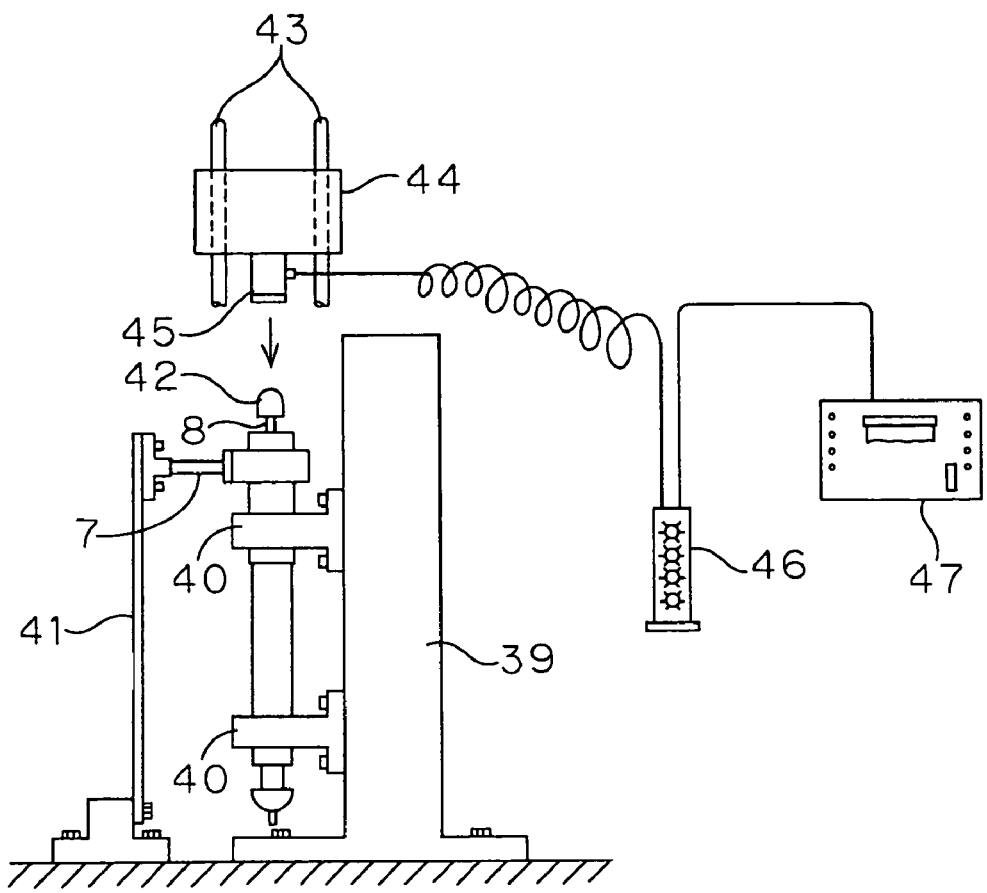
FIG. 7 is a view schematically showing a test device of an inverse input impact test.

A test device as shown in FIG. 7 was used. The steering racks 8 of the example and the steering racks of the comparative example were individually incorporated into the housing 17. The both ends of the housing 17 were fixed to a pair of fixing arms 40 fixed to a fixing pillar 39. The housing 17 was disposed to stand with the end closer to the pinion shaft 7 placed on the upper side. The pinion shaft 7 was fixed to a fixing pillar 41 at the neutral position. A receiving member 42 was fixed to the end of the steering rack 8 on the side closer to the pinion shaft 7.

A weight 44 supported on guiding bars 43 to be free to move vertically is provided above the receiving member 42, and a load cell 45 was fixed to the lower portion of the weight 44. A weight of the weight 44, to which the load cell 45 was fixed, was 100 Kg, and a distance between the load cell 45 and the receiving member 42 was 20 cm. Then, the weight 44 and the load cell 45 were dropped to collide with the receiving member 42. The number of droppings until the occurrence of a breaking was checked.

A dynamic strain meter 46 was connected to the load cell 45, and an output of the dynamic strain meter 46 was recorded in an electromagnetic oscilloscope 47.

The result of the test reveals that it took three times of droppings on average for a breaking to occur in the comparative example, whereas it took 15 times of droppings on average for a breaking to occur in the example. It is therefore proved that the inverse impact strength is far more excellent in the example than in the comparative example.

Bending Strength Test

Figure 8:
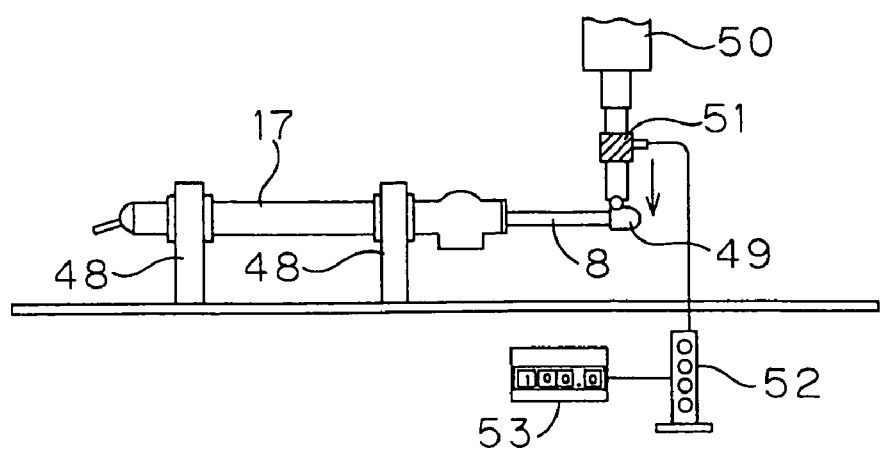
FIG. 8 is a view schematically showing a test device of a bending strength test.

A test device as is shown in FIG. 8 was used. The steering racks 8 of the example and the steering racks of the comparative example were individually incorporated into the housing 17. The both ends of the housing 17 were fixed to fixing pillars 48. While the steering rack 8 was held to protrude as much as possible from the end of the housing 17 on the side closer to the pinion shaft, a receiving member 49 fixed to the tip end of the steering rack 8 was pressed by a load cylinder 50 via a load cell 51. A bending load was kept applied until the largest load was obtained in the steering rack 8.

A load was measured by introducing an output of a dynamic strain detector 52 connected to the load cell 51 to a load meter 53. As a result, the largest applied load was 8.6 KN in the example whereas it was 7.4 KN in the comparative example. It is therefore confirmed that the example has bending strength increased by about 16% in comparison with the comparative example. In addition, it was confirmed that both are able to bend without causing a breaking.

Normal Input Durability Test

Figure 9:
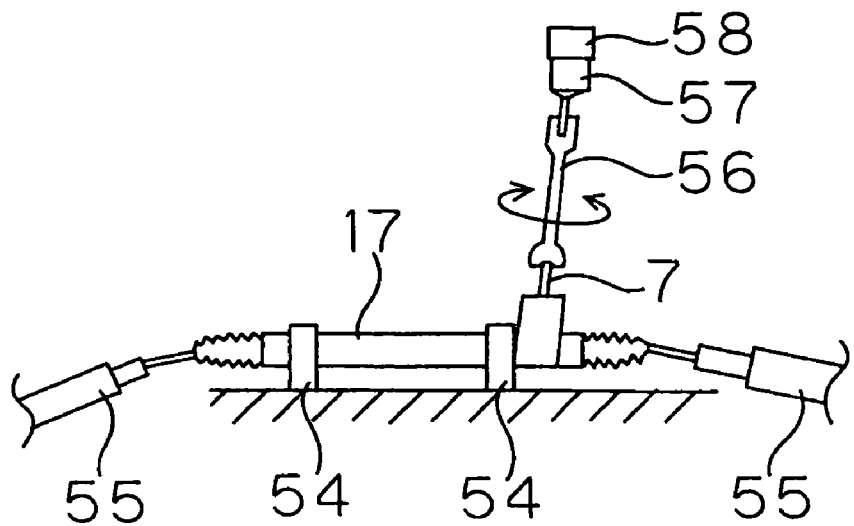
FIG. 9 is a view schematically showing a test device of a normal input durability test.

A test device as shown in FIG. 9 was used. The steering racks 8 of the example and the steering racks of the comparative example were individually incorporated into the housing 17. The both ends of the housing 17 were fixed to fixing pillars 54. Servo actuators 55 were linked to the both ends of the steering rack 8. A rotary actuator 58 was connected to the pinion shaft 7 via a joint 56 and a torque meter 57, and driving torque was provided to the pinion shaft 7 from the rotary actuators 58. The repetition number of times was set to 30,000 with the driving torque at 50 N·m and the frequency at 0.1 to 0.2 Hz.

When the test ended, a quantity of abrasion in a portion engaged with the pinion was measured. The quantity was 8.7 μm on average in the example, whereas it was 27.8 μm on average in the comparative example. It is therefore proved that a quantity of abrasion is reduced by about 70% in the example in comparison with the comparative example.

Inverse Input Durability Test

Figure 10:
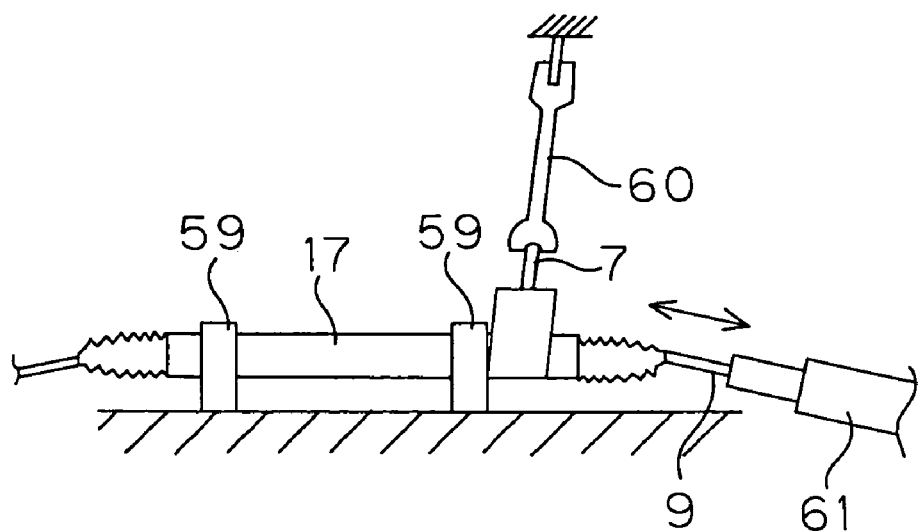
FIG. 10 is a view schematically showing a test device of an inverse input durability test.

A test device as shown in FIG. 10 was used. The steering racks 8 of the example and the steering racks of the comparative example were individually incorporated into the housing 17. The both ends of the housing 17 were fixed to fixing pillars 59. The pinion shaft 7 was fixed at the neutral position via a joint 60. An axial force from a servo actuator 61 was applied to the steering rack 8 via the tie rod 9 continued to the end of the steering rack 8 on the end closer to the pinion shaft 7. An axial force applied to the steering rack 8 was 9.8 kN, and the axial force was repetitively applied at the frequency of 5 Hz until a breaking occurred. As a result, it took 350,000 times for a breaking to occur in the comparative example, whereas no breaking occurred in the example when the axial force was applied 700,000 times.

Bending Fatigue Test

Figure 11A:
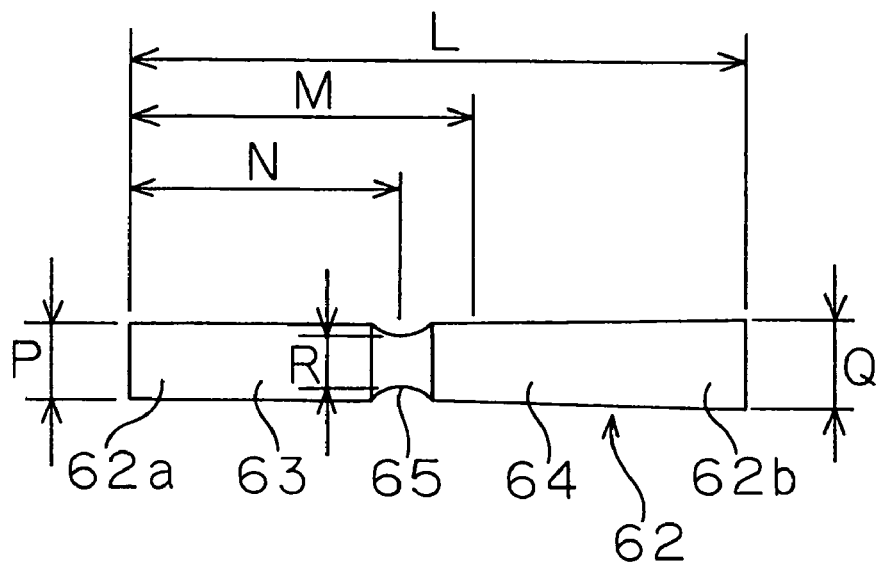
FIG. 11A is a side elevation schematically showing a test piece.

A test piece 62 as is shown in FIG. 11A was prepared from the material same as that of the example. The test piece 62 was an almost round shaft having a full length L of 90 mm. A neck portion 65 was formed to have a sectional curvature of R5 by setting the center at a distance N from one end 62*a* of the test piece 62, where N was 40 mm. The smallest diameter R of the neck portion 65 was 8 mm. A diameter P of a circular column 63 at the end 62*a* with the neck portion 65 in between was 12 mm. The other end 62*b* with the neck portion 65 in between formed a ½₀ tapering portion 64 that gradually increases in diameter as it comes closer to the other end 62*b*. The largest diameter Q of the tapering portion 64 was 14 mm. The same test piece was formed from the comparative example.

Figure 11B:
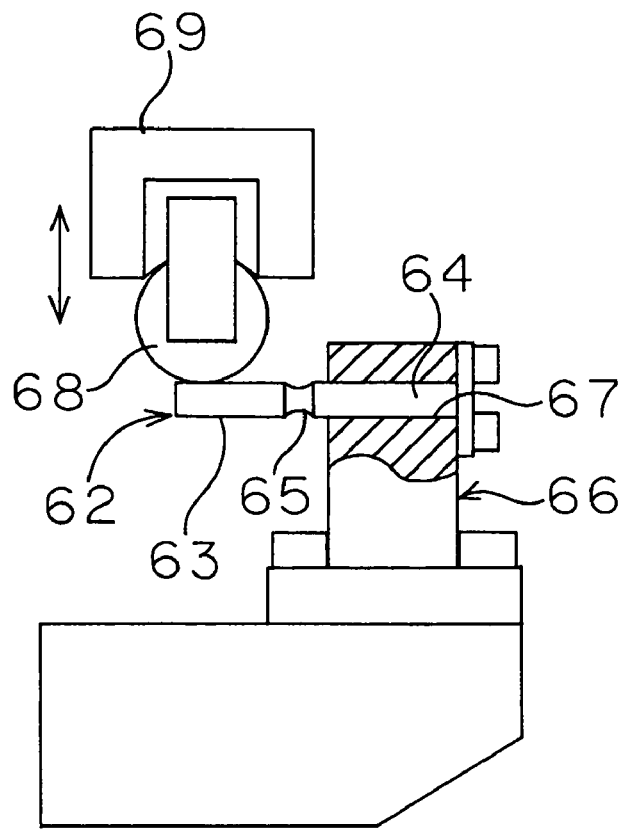
FIG. 11B is a view schematically showing a test device of a bending fatigue test.

A bending fatigue test was performed on the test piece 62 and the comparative piece using a test device as shown in FIG. 11B. A portion of the test piece 62 at a distance M from the end 62*a*, where M was 50 mm, was held to protrude in a cantilever state, and the remaining tapering portion 64 was fixed into a tapering supporting hole 67 in a fixing pillar 66. A bending load was repetitively applied from a load cylinder 69 in the vicinity of the end 62*a* of the fixed test piece 62 via a rolling roller 68 at the frequency of 20 Hz. An S-N curve was found by measuring stress and the number of repetition times.

The result of the test reveals that, in a smooth portion (a portion where stress converges) of the S-N curve, stress was 1270 MPa in the comparative piece, whereas stress was 1450 MPa in the test piece 62. It is therefore proved that the fatigue strength is enhanced by about 15%.

The invention claimed is:

1. A steering rack comprising:
   a steel bar that contains 0.50 to 0.60% by mass of C, 0.05 to 0.5% by mass of Si, 0.2 to 1.5% by mass of Mn, 0.0005 to 0.003% by mass of B, 0.005 to 0.05% by mass of Ti, 0.0005 to 0.1% by mass of Al, and 0.002 to 0.02% by mass of N;
   a rack teeth forming portion formed in the steel bar and including plural rack teeth, a hardening layer having undergone induction quenching and tempering, and a surface hardness of 680 to 800 HV in Vickers hardness; and a main body including the rack teeth forming portion on a peripheral surface thereof, a portion that opposes the rack teeth forming portion in a radius direction, and a portion present at a depth of (¾)D from a surface of the portion that opposes the rack teeth forming portion in the radius direction, where D is a diameter of the main body, wherein:

the steel bar and the steering rack are adjusted such that quenched and tempered structures in a portion of the steel bar at a depth of D/4 from a surface and quenched and tempered structures in the portion of the main body of the steering rack at the depth of (¾)D both satisfy conditions I), II), and III) as follows:

I) a sum of a tempered bainitic structure and a tempered martensitic structure accounts for 30 to 100% in area percentage, II) a regenerated perlite structure accounts for 0 to 50% in area percentage, and III) a sum of the tempered bainitic structure, the tempered martensitic structure, and the regenerated perlite structure accounts for 50 to 100% in area percentage.

2. A steering rack according to claim 1, wherein:

the rack teeth forming portion includes a teeth bottom portion; and an effective case hardened depth in the teeth bottom portion is 0.1 to 1.5 mm from a surface of the teeth bottom portion.

3. A steering rack according to claim 1, wherein:

the rack teeth forming portion includes a teeth bottom portion; and an effective case hardened depth in the teeth bottom portion is 0.3 to 1.2 mm from a surface of the teeth bottom portion.

4. A steering rack according to claim 1, wherein:

the rack teeth forming portion includes a teeth bottom portion; and no residual ferrite is contained in the teeth bottom portion in a 0.1 mm deep region from a surface thereof.

\* \* \* \* \*

UNITED STATES PATENT AND TRADEMARK OFFICE
CERTIFICATE OF CORRECTION

PATENT NO. : 7,662,245 B2　　　　　　　　　　　　　　　　　　　　　　　　　Page 1 of 1
APPLICATION NO. : 10/558359
DATED : February 16, 2010
INVENTOR(S) : Ohta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Thirtieth Day of November, 2010

David J. Kappos
*Director of the United States Patent and Trademark Office*